US012608224B2

(12) United States Patent
Liljedahl

(10) Patent No.: US 12,608,224 B2
(45) Date of Patent: Apr. 21, 2026

(54) LIGHTWEIGHT COOPERATIVE MULTI-THREADING

(71) Applicant: Arm Limited, Cambridge (GB)

(72) Inventor: Eric Ola Harald Liljedahl, Stockholm (SE)

(73) Assignee: Arm Limited, Cambridge (GB)

( * ) Notice: Subject to any disclaimer, the term of this patent is extended or adjusted under 35 U.S.C. 154(b) by 730 days.

(21) Appl. No.: 17/693,487

(22) Filed: Mar. 14, 2022

(65) Prior Publication Data

US 2023/0289217 A1      Sep. 14, 2023

(51) Int. Cl.
$G06F\ 9/48$      (2006.01)
$G06F\ 9/30$      (2018.01)
$G06F\ 9/4401$      (2018.01)
$G06F\ 21/60$      (2013.01)

(52) U.S. Cl.
CPC ........ G06F 9/4881 (2013.01); G06F 9/30101 (2013.01); G06F 9/4403 (2013.01); G06F 9/485 (2013.01); G06F 21/602 (2013.01)

(58) Field of Classification Search
None
See application file for complete search history.

(56) References Cited

U.S. PATENT DOCUMENTS 6,331,857 B1 * 12/2001 Hussain ................ G06F 9/3879
                                            345/553
2005/0125795 A1 * 6/2005 Kissell ................ G06F 9/3885
                                            718/100
2006/0179439 A1 * 8/2006 Jones ................... G06F 9/3888
                                            718/105
2008/0133897 A1 * 6/2008 Reid ................... G06F 11/3632
                                         714/E11.21
2010/0115244 A1 * 5/2010 Jensen ................. G06F 9/3888
                                            712/220

(Continued)

OTHER PUBLICATIONS

Mostafa et al.; "An Adjustable Round Robin Scheduling Algorithm in Interactive Systems"; May 2019; Information Engineering Express International Institute of Applied Informatics; vol. 5, No. 1, 11-18; pp. 11-18. (Year: 2019).*

(Continued)

*Primary Examiner* — Umut Onat
(74) *Attorney, Agent, or Firm* — NIXON & VANDERHYE P.C.

(57) ABSTRACT

Methods of data processing and data processing apparatuses are disclosed. When performing data processing operations in response to program instructions, a scheduler is operated to support cooperative scheduling of multiple processes with reference to a circular scheduler queue comprising one or more queue elements. Each process of the multiple processes, when active as a currently executing process, is arranged to yield execution at a yield instruction to allow a next process of the multiple processes to continue execution. When the currently executing process yields, the scheduler initiates execution of the next process by reading context data for the next process from a queue element pointed to by a schedule pointer and writes the context data for the currently executing process to the same queue element, before advancing the schedule pointer. Lightweight cooperative scheduling is thereby supported.

19 Claims, 7 Drawing Sheets

(56)  References Cited

U.S. PATENT DOCUMENTS

| | | | |
|---|---|---|---|
| 2012/0137299 A1* | 5/2012 | Moyer | G06F 3/0613 |
| | | | 718/102 |
| 2012/0194526 A1* | 8/2012 | Sander | G06F 9/38885 |
| | | | 345/503 |
| 2014/0047215 A1* | 2/2014 | Ogasawara | G06F 8/4451 |
| | | | 712/205 |
| 2014/0101643 A1* | 4/2014 | Inoue | G06F 8/4441 |
| | | | 717/156 |
| 2015/0145871 A1* | 5/2015 | Parker | G06F 9/45516 |
| | | | 345/505 |
| 2016/0140686 A1* | 5/2016 | Lueh | G06F 9/462 |
| | | | 345/522 |
| 2016/0188366 A1* | 6/2016 | Lipsio, Jr. | G06F 9/4843 |
| | | | 718/103 |

OTHER PUBLICATIONS

Kiriansky, V. et al., "Cimple: Instruction and Memory Level Parallelism, A DSL for Uncovering ILP and MLP" PACT '18, Limassol, Cyprus. Nov. 1-4, 2018. (16 pages).

"Coroutine" Wikipedia. Last edited Nov. 24, 2021. (14 pages).

Jonathan, C. et al., "Exploiting Coroutines to Attack the Killer Nanoseconds" University of Minnesota, Microsoft. 2018. Proceedings of the VLDB Endowment, vol. 11, No. 11, Aug. 2018, pp. 1702-1714. (13 pages).

"Performance, Table 1.1. Performance of context switch" Oliver Kowalke. 2014. (1 page).

Mowry, T. et al., "Software-Controlled Multithreading Using Informing Memory Operations" School of Computer Science, Carnegie Mellon University. Oct. 1998. pp. 1-14. (16 pages).

* cited by examiner

250 — ORIGINAL PROGRAM INSTRUCTIONS

252 — BEGIN COMPILATION PROCESS

254 — ITERATE THROUGH PROGRAM INSTRUCTIONS

256 — YIELD POINT ?

258 — INLINE ASSEMBLY INSTRUCTIONS FOR CONTEXT SWITCH INSERTED

260 — FURTHER PROGRAM INSTRUCTIONS ?

262 — COMPILATION COMPLETE

LIGHTWEIGHT COOPERATIVE MULTI-THREADING

TECHNICAL FIELD

The present disclosure relates to data processing. In particular, the present disclosure relates to techniques for switching between concurrent execution contexts.

DESCRIPTION

A data processing apparatus may be arranged to execute multiple execution threads, whereby a scheduler determines which of the threads is currently being executed at any given time. This can be advantageous when the data processing apparatus has several tasks which it should progress and where at any given time each task may be better or worse placed to make forward progress, depending on the availability of the data it is processing, for example. Each thread has its own context data, corresponding the particular instruction sequence it is executing and its subject data, and switching between threads therefore necessarily also involves switching between such context data.

SUMMARY

In one example described herein there is a method of data processing comprising: performing data processing operations in response to program instructions, wherein the data processing operations comprise multiple processes; operating a scheduler to support cooperative scheduling of the multiple processes, wherein the scheduler is configured to support the cooperative scheduling of the multiple processes with reference to a circular scheduler queue comprising one or more queue elements; executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process: to initiate execution of the next process by reading context data for the next process from the next queue element and writing context data for the currently executing process to the next queue element; and to advance the schedule pointer.

In one example described herein there is a data processing apparatus comprising: processing circuitry configured to perform data processing operations in response to program instructions, wherein the data processing operations comprise multiple processes and wherein the data processing operations comprise operating a scheduler to support cooperative scheduling of the multiple processes, wherein the scheduler is configured to support the cooperative scheduling of the multiple processes with reference to a circular scheduler queue comprising one or more queue elements, wherein the multiple processes cooperate for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process: to initiate execution of the next process by reading context data for the next process from the next queue element and writing context data for the currently executing process to the next queue element; and to advance the schedule pointer.

In one example described herein there is a data processing apparatus comprising: means for performing data processing operations in response to program instructions, wherein the data processing operations comprise multiple processes; scheduling means for supporting cooperative scheduling of the multiple processes, wherein the scheduler is configured to support the cooperative scheduling of the multiple processes with reference to a circular scheduler queue comprising one or more queue elements; means for executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduling means is responsive to the currently executing process yielding execution to the next process: to initiate execution of the next process by reading context data for the next process from the next queue element and writing context data for the currently executing process to the next queue element; and to advance the schedule pointer.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
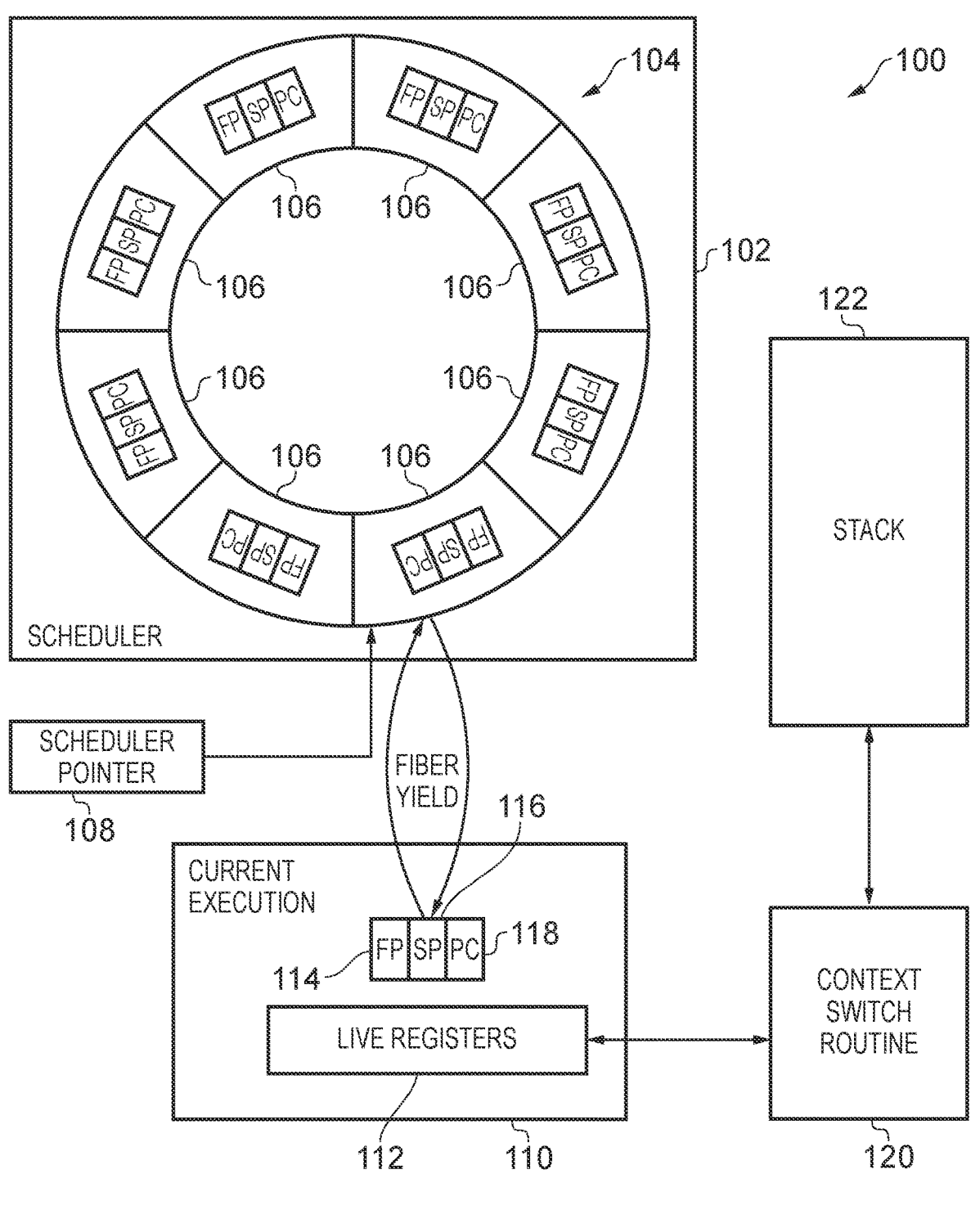
FIG. 1 schematically illustrates a data processing apparatus in accordance with some examples.

Before discussing the embodiments with reference to the accompanying figures, the following description of embodiments is provided.

In accordance with one example configuration there is provided a method of data processing comprising: performing data processing operations in response to program instructions, wherein the data processing operations comprise multiple processes; operating a scheduler to support cooperative scheduling of the multiple processes, wherein the scheduler is configured to support the cooperative scheduling of the multiple processes with reference to a circular scheduler queue comprising one or more queue elements; executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process: to initiate execution of the next process by reading context data for the next process from the next queue element and writing context data for the currently executing process to the next queue element; and to advance the schedule pointer.

Some data processing applications may have memory access patterns which do not adhere to any kind of regular, and hence predictable, pattern, meaning that memory prefetching and out-of-order execution techniques may be of little help in supporting efficient resource utilisation and maintaining high data processing throughput. Such data processing applications may therefore suffer from frequent stalls, leading to poor CPU utilisation. Whilst software workarounds (such as looping over a set of data references and prefetching data items before processing the data) are possible, they are also often either not practically possible or require an undesirable level of manual intervention. Instead the present techniques propose an approach which is based on cooperative multithreading, that is where multiple processes (frequently referred to herein as "fibers") are concurrently in flight and a scheduler determines which of them is currently being executed by the data processing apparatus at any given time and the switching between them. Accordingly, in order for this approach to be sufficiently efficient that it is worthwhile, it is necessary for the context switch between fibers to only incur a minimal degree of processing overhead. As such it must therefore minimise the number of instructions and the amount of memory, i.e. the number of cache lines, accessed, in order to minimise the risk of additional cache misses (and the delays that they would incur). Prior art implementations of cooperative multithreading (also known as coroutines) can incur significant overhead to implement the required context switches, for example in saving and restoring all callee-saved registers, possibly including floating point (FP) and single instruction multiple data (SIMD) registers, in separate context buffers. The context switch can also be implemented using the C programming language's setjmp/longjmp facility, which will save and restore all callee-saved registers. By contrast the present techniques propose an approach in which a minimal amount of execution context is embedded into the scheduler queue itself. Furthermore, the scheduler queue is a circular queue which automatically wraps around when contexts are saved (pushed) and restored (popped). There are a number of known ways in which a circular buffer can be implemented, including using a ring buffer, an array of power-of-two size which is indexed by separate head and tail "pointers" (implemented as e.g. free-running indexes). Moreover, the scheduler queue is arranged such that there is only one pointer (index) into the queue. The queue element referenced by this pointer is used for both the outgoing and incoming contexts. Accordingly, the incoming context is first read from the queue element before the outgoing context is written to the same queue element (thus overwriting the previous content). The limited amount of context data which the present techniques require to be read and written in this manner makes this approach practical. This provides an efficient approach since all scheduler queue data is located together and pointer chasing is avoided. This improves performance and determinism, and decreases the overhead, in particular implementations supporting out-of-order instruction execution.

As mentioned above, the present techniques switch a limited amount of context data in and out of the relevant queue element in the circular scheduler queue. This may be variously implemented, but in some examples the program instructions comprise context switching instructions at a yield point in the program instructions, wherein the context switching instructions are arranged to cause all live registers other than a subset of live registers comprised by the context data for the current executing process written to the next queue element to be saved to memory, and to cause all live registers other than the subset of live registers comprised by the context data of the next process read from the next queue element to be restored from memory. Thus limiting the register contents which must be copied into the queue element in the circular scheduler queue to just a subset, and relying on the supporting context switching instructions to cause all other live registers to be saved (to the stack) and restored, supports the lightweight context switching.

In some examples the subset of live registers comprises a frame pointer, a stack pointer, and a program counter. In some examples the subset of live registers further comprises a base pointer.

The yield point may be variously defined and implemented. In some examples a user may choose to manually annotate the source code. Some use of compilation techniques may also be made, whereby the source code may be written with certain actions such as loads explicitly labelled as "potentially slow", whereby a compiler encountering such "slow loads" can replace them with an explicit prefetch followed by a yield instruction. In some examples the yield instructions are explicitly programmed by the programmer and the yield point is indicated by the yield instruction in the program instructions. In other examples the indication of yield points may be at least partially automated, in particular involving a compiler, through the observation of previous performance. Accordingly, in some examples, the yield point is identified by a compilation process in dependence on profiling data.

The present techniques recognise that yield points may be beneficially associated with a number of different types of data processing operations. In some examples the yield point is associated with a load operation. In some examples the yield point is associated with an asynchronous operation. Generally speaking, any asynchronous operation could carry the potential to undesirably delay forward progress of a given process and thus the asynchronous operation may take a variety of forms. In some examples the asynchronous operation is one of: an asynchronous memory copy operation; an asynchronous cryptographic operation; and an asynchronous input/output operation. These are each recognised as example of asynchronous operations which might take an indeterminate amount of time to complete or at least will take a sufficiently long period of time to complete that improved data processing throughput is supported if a process which initiates such an operation can then yield to another process to make forward progress whilst the operation is being carried out.

In some examples the method further comprises performing an initialisation process prior to the performing data processing operations, wherein the initialisation process comprises instantiating a predetermined number of processes for cooperative scheduling by the scheduler. The predetermined number of processes may be programmer-defined.

The number of processes which are cooperatively scheduled by the scheduler may in some examples be at least partially dynamic, whereby in some examples the performing data processing operations further comprises: monitoring at least one data processing performance indicator; and in response to at least one performance criterion, instantiating a further process for cooperative scheduling by the scheduler by creating an additional queue element in the circular scheduler queue holding context data for the further process. Generally speaking, the overall goal of running multiple fibers may be described as to improve throughput and accordingly the at least one performance criterion may be a measurement of current throughput.

Synchronisation of the progress of the multiple fibers is supported in some examples by the provision of a "fiber barrier", whereby the program instructions comprise a process barrier instruction defining a process barrier, and wherein the performing data processing operations comprises, in response to the process barrier instruction, stalling each of the multiple processes until all of the multiple processes have progressed to and entered the process barrier.

There may be circumstances when the circular scheduler queue is empty, i.e. no context data is held in any of its possible queue elements, and hence in some examples the scheduler is responsive to the currently executing process yielding execution and an empty status of the circular scheduler queue to cause the currently executing process to continue execution.

Not all processes which are executed are cooperatively scheduled with reference to the circular scheduler queue and whilst the method may involve iterating between various processes which are cooperatively scheduled with reference to the circular scheduler queue, the method may further involve a hand-over to a non-cooperatively scheduled process. Accordingly, in some examples the scheduler is responsive to the currently executing process pausing or exiting execution and an empty status of the circular scheduler queue to cause the performing data processing operations to continue with a further process which is not cooperatively scheduled with reference to the circular scheduler queue.

As mentioned above an asynchronous operation is recognised here as one which may take an indeterminate amount of time to complete and therefore it may be preferable, when such an asynchronous operation has been initiated by one fiber, for the fiber to yield to the next fiber in order to support forward progress. However once the asynchronous operation has completed it may be desirable for switching between fibers to occur in order to allow further forward progress of the fiber which initiated the asynchronous operation to occur, and hence there are some examples, wherein the currently executing process is configured to monitor progress of an asynchronous background operation and wherein yielding execution to the next process is dependent on a completion status of the asynchronous background operation.

Various operations related to the creation, operation, and conclusion of fibers are also proposed. There are some examples wherein the performing data processing operations further comprises pausing a process for which selected context data is currently actively determining the currently executing process of the circular scheduler queue, wherein pausing the process comprises: storing the selected context data to memory, and wherein the performing data processing operations further comprises resuming a paused process for which paused context data is stored in memory by: creating a resumed queue element in the circular scheduler queue; and copying the paused context data from memory to the resumed queue element.

As mentioned above compilation techniques may also form part of some examples of the present techniques. Hence there are also some examples further comprising: performing a compilation process prior to the performing data processing operations, wherein the compilation process comprises transforming an input set of program instructions into a compiled set of program instructions, wherein the performing data processing operations is performed in response to execution of the compiled set of program instructions, and wherein the compilation process comprises introducing the context switching instructions at the yield point in the input set of program instructions.

In accordance with one example configuration there is provided a data processing apparatus comprising: processing circuitry configured to perform data processing operations in response to program instructions, wherein the data processing operations comprise multiple processes and wherein the data processing operations comprise operating a scheduler to support cooperative scheduling of the multiple processes, wherein the scheduler is configured to support the cooperative scheduling of the multiple processes with reference to a circular scheduler queue comprising one or more queue elements, wherein the multiple processes cooperate for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process: to initiate execution of the next process by reading context data for the next process from the next queue element and writing context data for the currently executing process to the next queue element; and to advance the schedule pointer.

In accordance with one example configuration there is provided a data processing apparatus comprising: means for performing data processing operations in response to program instructions, wherein the data processing operations comprise multiple processes; scheduling means for supporting cooperative scheduling of the multiple processes, wherein the scheduler is configured to support the cooperative scheduling of the multiple processes with reference to a circular scheduler queue comprising one or more queue elements; means for executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduling means is responsive to the currently executing process yielding execution to the next process: to initiate execution of the next process by reading context data for the next process from the next queue element and writing context data for the currently executing process to the next queue element; and to advance the schedule pointer.

Particular embodiments will now be described with reference to the figures.

FIG. 1 illustrates some component and their interaction of a data processing apparatus 100 in accordance with some examples. The apparatus 100 comprises a scheduler 102, which itself comprises a circular scheduler queue 104 comprising a number of queue elements 106. Eight queue elements 106 are shown in the example of FIG. 1, though the present techniques are not limited to any particular number of queue elements. The content of each queue element corresponds to a fiber which the for which the scheduler administers cooperative scheduling. A next fiber to be executed is indicated by a schedule pointer 108. The current data processing 110 being carried out is defined by the contents of a number of registers, these comprising a set of live registers 112, as well as a frame pointer register 114, a stack pointer register 116, and a program counter register 118. Each queue element 106 of the circular scheduler queue 104 holds three values corresponding to a queued fiber, these being a frame pointer (FP), a stack pointer (SP), and a program counter (PC). In some examples (such as a 32-bit Arm architecture) the Base Pointer (BP) register is also saved to the queue element. In other examples (such as that explicitly shown in FIG. 1—a 64-bit Arm architecture example) the BP doesn't exist and is not saved. In essence, if the program uses a Base Pointer (separate from the FP), then it is saved explicitly (by the fiber implementation). When a switch between fibers occurs, also referred to herein as the current fiber yielding to the next fiber, the content of the "next" queue element (to which the scheduler pointer is pointing) is read out, and the current content of the frame pointer register 114, the stack pointer register 116, and then the program counter register 118 (and, if applicable the base pointer register) are written into the same queue element, i.e. overwriting the previous content. The scheduler pointer is then incremented to indicate the new next fiber/queue element. At the same time a context switch routine 120 is responsible for saving to the stack 122 any live registers 112. Any unused registers clearly do not need to be saved/restored. The number of active fibers can vary, and new fibers can be created, wherein the relevant context data (i.e. the frame pointer, stack pointer, and program counter (and base pointer, if applicable) of the entry point) is stored in a new element which is added to the queue. Equally when a fiber completes its corresponding queue entry is deleted. In the event that the queue 104 is empty (i.e. there are currently no ready fibers), the execution returns to another thread (i.e. not a fiber managed with reference to the queue 104) which started the fiber environment. Alternatively, if a currently executing fiber yields execution, yet the queue 104 is currently empty, then the yield instruction is simply treated as a no-op and the currently executing fiber continues execution uninterrupted. A fibers may also pausing execution, meaning that it halts execution and its state fully stored to memory (i.e. not put back into the circular scheduler queue) or exit execution (when it finally completes and will not be resumed). In either the case of a pausing fiber or an exiting fiber and an empty status of the circular scheduler queue the data processing operations continue with a further process which is not cooperatively scheduled with reference to the circular scheduler queue.

This approach to lightweight user-space multithreading supports pseudo-concurrent execution of fibers in a single-threaded programming model. One aim here is to preserve the original synchronous programming model (preserving source code simplicity and programmer productivity). Nevertheless, several approaches to the implementation of these techniques are proposed, in particular that the programmer can choose to manually annotate source code to indicate suitable yield points or that these can be automatically identified by compiler-based techniques. For example, (in the case of slow loads which represent one category of suitable yield point) the user can manually annotate the source code. This could either be by inserting explicit prefetch and fiber_yield commands in relevant places, or by replacing "slow" loads with a macro that is expanded by the compiler. Hence:

data=SLOW_LOAD(ptr);

can be expanded by the compiler into:

prefetch(ptr);

fiber_yield( );

data=*ptr;

The fiber_yield( ) macro represents the steps which save context of the currently executing fiber, and restore the context of next fiber (from the circular scheduler queue), resuming execution. An example implementation is:

```
#define fiber_yield ( ) \
    { \
        struct fiber_context *ctx = fiber.nxt; \
        if (likely (ctx != NULL) ) \
        { \
            fiber.nxt = ctx->nxt; \
            nf_cross_jump (ctx) ; \
        } \
    }
```

The yield/context switch code which supports this approach (and means that only the frame pointer (FP), stack pointer (SP), and program counter (PC) (and base pointer (BP, if applicable) need be saved) can be efficiently implemented in a minimal set of instructions, allowing it to be in-lined in the application. For example, when coded in the Arm architecture (64-bit), such a context switch can be implemented using the example implementation shown below:

```
static void_attribute_( ( (always_inline) )
nf_cross_jump (struct fiber_context *ctx)
{
_asm_volatile (
    "ldp x4, x5, [%0] ;"       / /Load new PC and SP
    "ldr x6, [%0, #16] ;"      / / Load new FP
    "str fp, [ %0, #16] ; "    / / Save old FP
    "mov fp, x6;"              / / Restore FP
    "mov x2, sp;"              / / Read old SP
    "adr x3, 1f;"              / /Read PC of "1" label
    "stp x3, x2, [ %0] ;"      / / Save old PC and old SP
    "mov sp, x5;"              / / Restore SP
    "br x4;"                   / / Jump to (restore) PC
    ".align 4;"
    "1: hint #0x24;"           / /BTI J - indirect jump landing pad
    : "+r" (ctx)
    :
    :       "x1", "x2", "x3", "x4", "x5", "x6", "x7",
        "x8", "x9", "x10", "x11", "x12", "x13", "x14", "x15",
        "x16", "x17", "x18", "x19", "x20", "x21", "x22", "x23",
```

-continued

```
        "x24", "x25", "x26", "x27", "x28", /*fp*/ "x30", /*sp* /
        "v0", "v1", "v2", "v3", "v4", "v5", "v6", "v7",
        "v8", "v9", "v10", "v11", "v12", "v13", "v14", "v15",
        "v16", "v17", "v18", "v19", "v20", "v21", "v22", "v23",
        "v24", "v25", "v26", "v27", "v28", "v29", "v30", "v31",
        "cc", "memory") ;
    }
```

Figure 2:
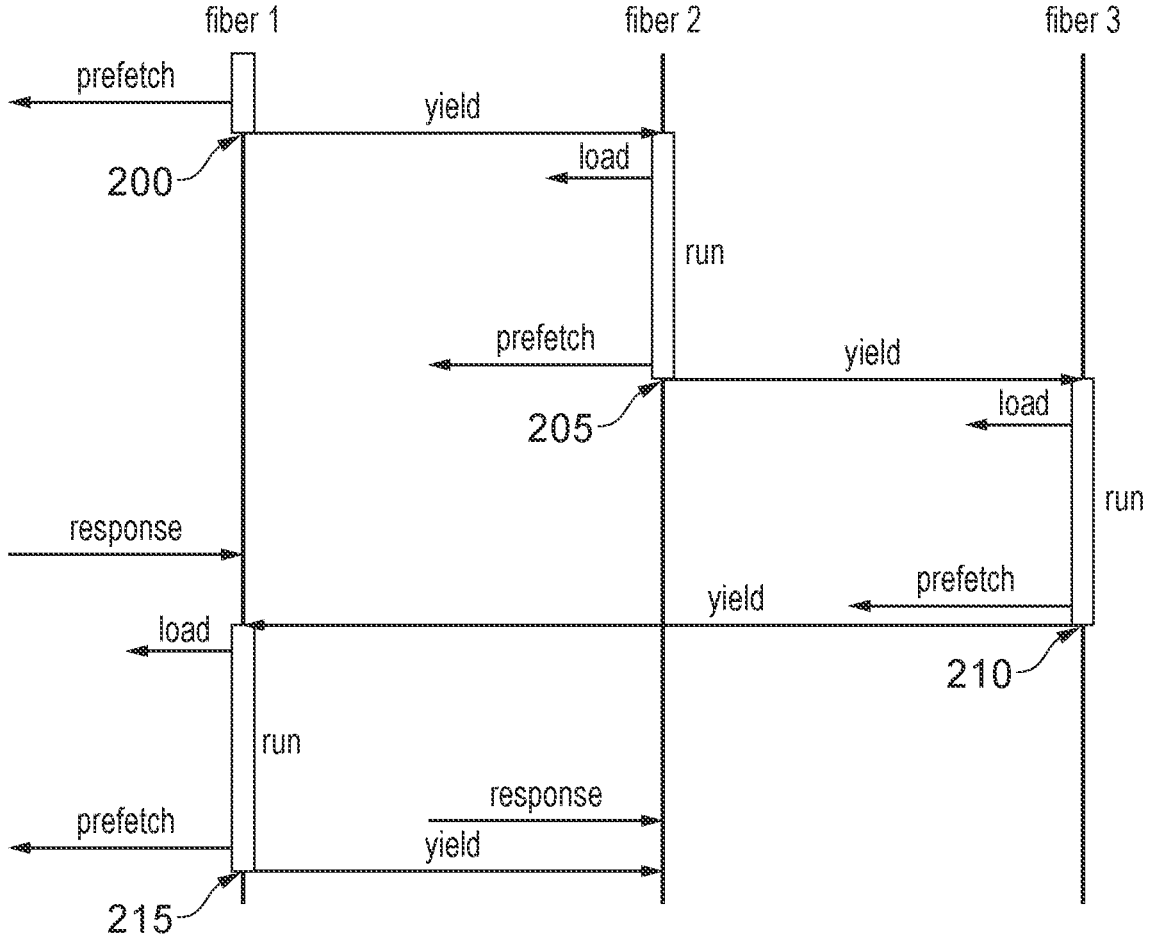
FIG. 2 is a timing diagram showing the scheduling of three concurrent fibers, the time periods for which each executes, and the point at which each yields to the next in accordance with some examples.

FIG. 2 is a timing diagram showing the scheduling of three concurrent fibers (fiber 1, fiber 2, and fiber 3), the time periods for which each executes, and the point at which each yields to the next in accordance with some examples. Time flows from top to bottom in the diagram and accordingly the diagram begins with fiber 1 executing. However, fiber 1 soon encounters a "slow load", i.e. one which is expected to take significant time to complete, and the slow load is for this reason in fact implemented as a prefetch/load pair. Fiber 1 triggers the prefetch and then at yield point 200 yields to the next queued fiber, i.e. fiber 2. Execution of fiber 2 begins, soon executing a load (for which a previous prefetch has already completed) and subsequently performing ("run") various data reprocessing with respect to the data retrieved by that load, until it too soon encounters a "slow load", i.e. one which is expected to take significant time to complete, and the slow load is for this reason in fact implemented as a prefetch/load pair. Fiber 2 triggers the prefetch and then at yield point 205 yields to the next queued fiber, i.e. fiber 3. Execution of fiber 3 begins, soon executing a load (for which a previous prefetch has already completed) and subsequently performing ("run") various data reprocessing with respect to the data retrieved by its load. soon encounters a "slow load", i.e. one which is expected to take significant time to complete, and the slow load is for this reason in fact implemented as a prefetch/load pair. Fiber 3 triggers the prefetch and then at yield point 210 yields to the next queued fiber, i.e. fiber 1, since currently only 3 fibers are concurrently being executed and therefore the order wraps around at this point. Execution of fiber 1 continues, soon executing a load (and note that the response for the prefetch initiated just before yield point 200 returned just before execution control returned to fiber 1) and subsequently performing ("run") various data reprocessing with respect to the data retrieved. Next, fiber 1 again encounters a "slow load", triggers a corresponding prefetch, and again yields to fiber 2 at yield point 215.

Figure 3:
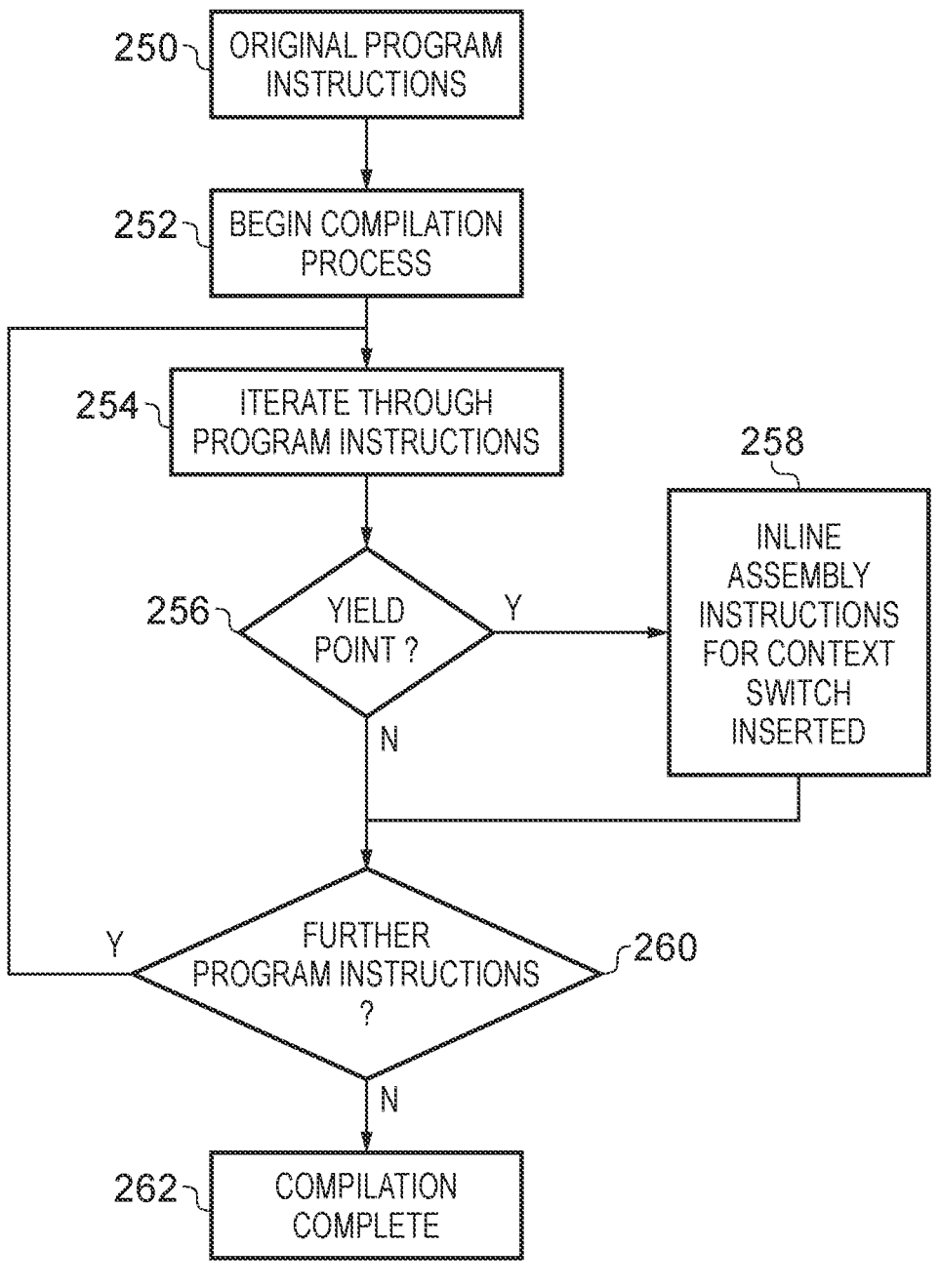
FIG. 3 is a flow diagram showing a sequence of steps which are taken by a compiler in carrying out a compilation process in accordance with the method of some examples.

As mentioned above, the insertion of inline assembly instructions to support context switches at yield points may be entirely manual or may be supported by a compilation process. FIG. 3 is a flow diagram showing a sequence of steps which are taken by a compiler in carrying out a compilation process in accordance with the method of some examples. This process begins with a set of original program instructions at step 250. Compilation of those instructions then begins at step 252. As part of the compilation process the compiler iterates through the program instructions (step 254) and for each instruction determines at step 256 whether this represents a yield point. On the one hand these yield points may be explicitly inserted by the original programmer or on the other hand the compiler may have static definitions of operations at which point a yield is usefully implemented, such as the above-mentioned "slow loads". In other examples the compiler may be set up more dynamically, where recent profiling data is used to determine useful yield points, and these are then fed into the current compilation process. By whatever means it is determined, if this is determined to be a yield point at step 256 then the flow proceeds via step 258 where the compiler inlines a set of assembly instructions which implement the required context switch. Otherwise the flow proceeds directly to step 260, where it is determined if there are further program instructions to be compiled. When there are the flow loops back to step 254. Otherwise the compilation process completes at step 262.

Figure 4:
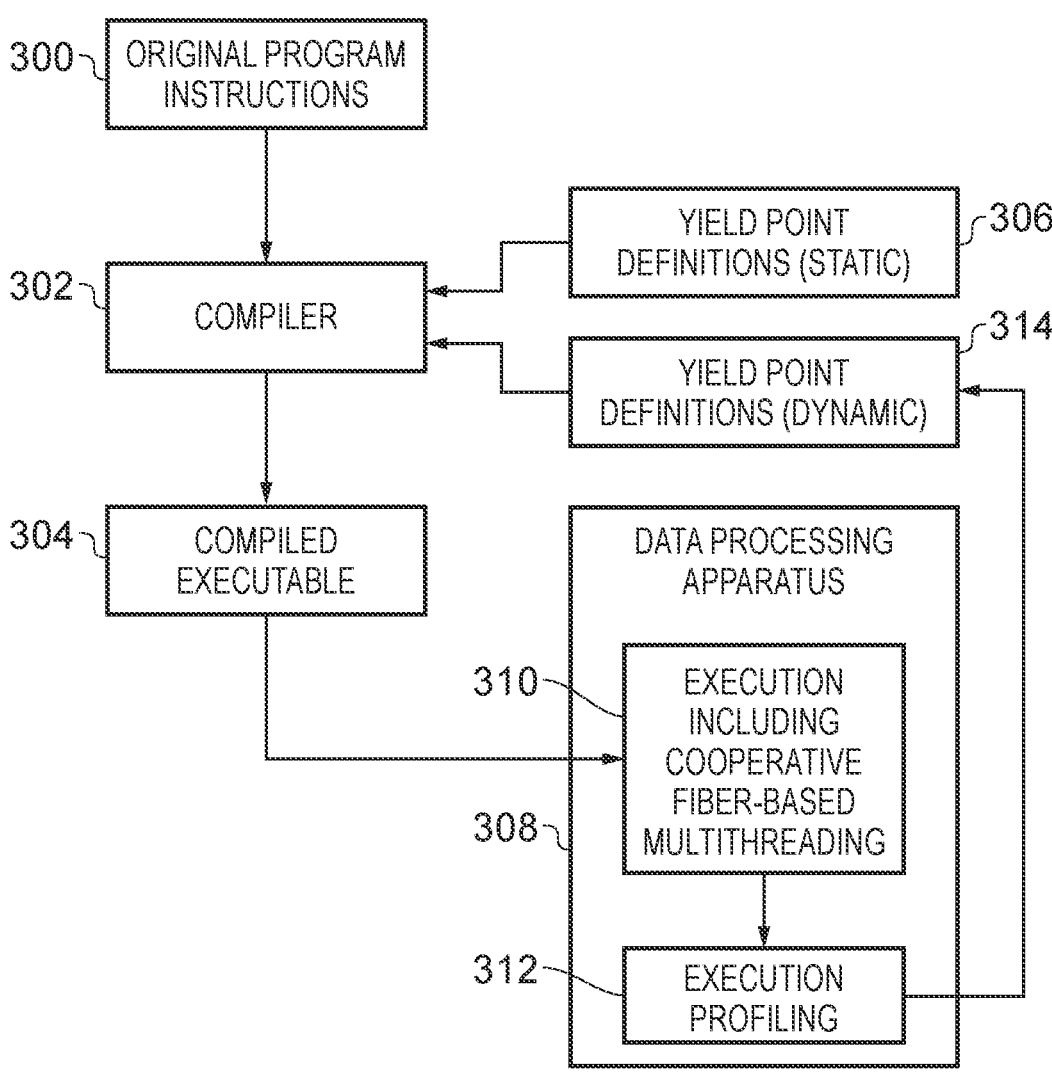
FIG. 4 schematically illustrates the compilation and execution of instructions with respect to a data processing apparatus in accordance with some examples.

FIG. 4 schematically illustrates the compilation and execution of instructions with respect to a data processing apparatus in accordance with some examples. A set of original program instructions 300 form the basis of the compilation/execution and thus are provided to the compiler 302, which processes these programmer-defined instructions to generate a compiled executable 304. In doing so, and in accordance with the present techniques, the compiler 302 identifies yield points in the original program instructions. On the one hand these yield points may be identified with reference to static yield point definitions 306, whereby certain operations, in particular certain asynchronous operations, are predefined as suitable yield points, since it can be expected that their completion will take a significant time-period (in the context of forward CPU progress) and therefore that whilst they are being carried out it would be beneficial for other processes to make forward progress. The context of the present techniques, where such an asynchronous operation may be associated with a given fiber, other fibers may make progress in the interim. Example operations which may therefore be predefined (in the static yield point definitions 306) comprise load operations, an asynchronous memory copy operation, an asynchronous cryptographic operation, and an asynchronous input/output operation. The compiled executable 304 is provided to the data processing apparatus 308, which executes the executable, where in the context of the present disclosure, this execution 310 comprises cooperative fiber-based multithreading as described herein. In addition to the circuitry which it comprises to support such execution, the data processing apparatus 308 further comprises execution profiling circuitry 312, which is arranged to monitor various performance metrics associated with the execution 310. On the basis of this execution profiling 312 one or more yield point definitions may be created. For example, regardless of the particular operations being carried out, the execution profiling 312 may identify that a certain set of program instructions commonly causes a CPU stall for a certain time period, before further progress is made. This set of program instructions can then be identified as a useful yield point at which the fiber executing those instructions should yield to another fiber, in order to benefit the overall execution throughput of the data processing apparatus 308. Hence, a set of dynamically generated yield point definitions 314 can be generated by the execution profiling circuitry 312 and provided as a further input to the compiler 302.

Figure 5:
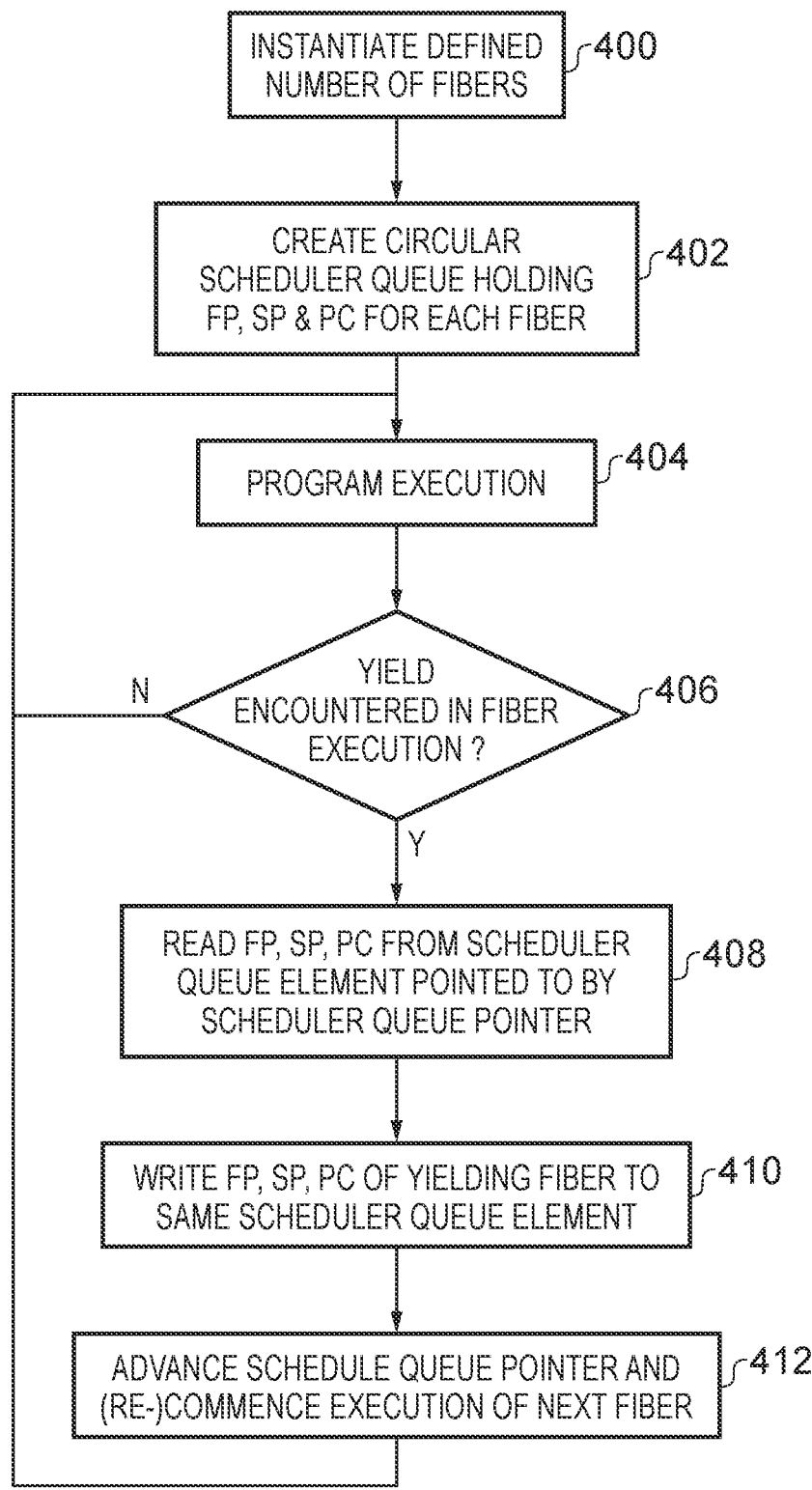
FIG. 5 is a flow diagram showing a sequence of steps which are taken by a data processing apparatus in which fiber execution is scheduled with the use of a circular scheduler buffer in accordance with the method of some examples.

FIG. 5 is a flow diagram showing a sequence of steps which are taken by a data processing apparatus in which fiber execution is scheduled with the use of a circular scheduler buffer in accordance with the method of some examples. The process begins with a defined number of fibers being instantiated at step 400, whereby this involves, at step 402, a circular scheduler queue being created holding corresponding frame pointer, stack pointer, and program counter values (and base pointer, if applicable) for each fiber. Program execution then proceeds at step 404, whereby until a yield point is encountered in the fiber execution (at step 406), the process flow remains at step 404 for further program execution to continue. However, when at step 406 a yield point is encountered, then the flow proceeds to step 408, where the frame pointer, stack pointer, and program counter values (and base pointer, if applicable) for the next fiber to be executed, which are stored in the circular scheduler queue element currently pointed to by the scheduler queue pointer, are read (being temporarily stored in 3 available spare registers). At step 410, the frame pointer, stack pointer, and program counter value (and base pointer, if applicable) of the yielding fiber (i.e. that which has been executing up to this point) are written into the same circular scheduler queue element pointed to by the scheduler queue pointer. Finally, at step 412, the scheduler queue pointer is incremented and execution of the new fiber is (re)-commenced (noting that this new fiber may be being executed for the first time or may be being returned to after it previously yielded). The process flow then returns to step 404 the program execution to continue.

Figure 6:
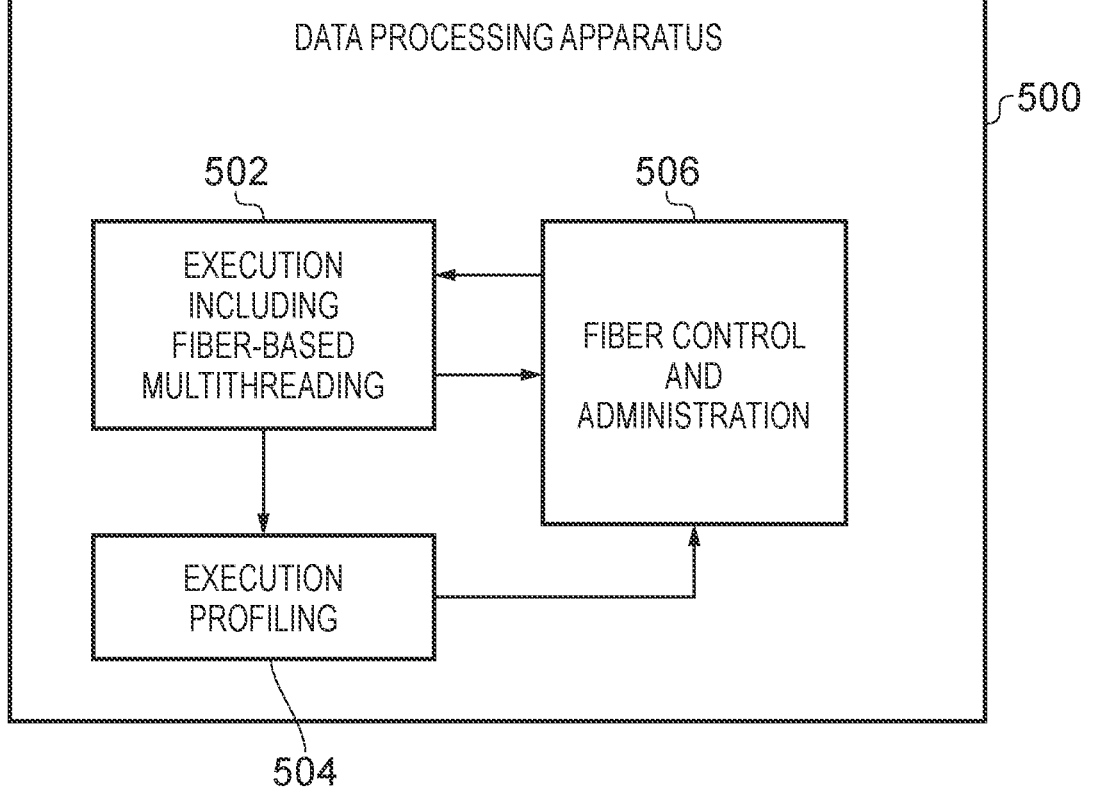
FIG. 6 schematically illustrates the control and administration of fibers in a data processing apparatus in accordance with some examples.

FIG. 6 schematically illustrates the control and administration of fibers in a data processing apparatus in accordance with some examples. The data processing apparatus 500 is shown to comprise instruction execution 502 including fiber-based multithreading in accordance with the present techniques. Execution profiling 504 is carried out to monitor various aspects of the execution of the respective fibers, and one or more performance metrics is provided to the fiber control and administration 506. The fiber control and administration 506 is the process responsible for instantiating fibers when they are set up (see step 400 and 402 of FIG. 5) and can also control the operation of the fibers on an ongoing basis, for example fibers can also be paused and resumed. To be clear it should be understood that this is intended to be distinct from the regular administration of fibers yielding to one another, with a paused fiber being typically paused from execution for longer than the typical period between execution episodes of a fiber scheduled by the scheduler with reference to the circular scheduler queue. Thus the context for a paused fibers is not be stored in the scheduler queue, but must be stored elsewhere (e.g. in a selected other memory location). In pausing a fiber, the context for that fiber (i.e. the frame pointer, stack pointer, and program counter, (and base pointer, if applicable) as well as any other live registers) is stored to memory, and the corresponding queue element in the circular scheduler queue can be deleted. Conversely, when a paused fiber is resumed, its context is copied back from memory, with a new queue element in the circular scheduler queue being created and populated with the frame pointer, stack pointer, and program counter (and base pointer, if applicable), whilst any other register content for that fiber is copied to the stack (in the manner which it would have been as an active, yielding fiber). Note that stack management is performed outside of the fiber implementation. This enables custom stack management, which can be carried out very efficiently (e.g. pre-allocating a large buffer, which is split into a stack area per fiber). The user can also implement their own stack utilization checks, for example to monitor how much stack was ever used by each fiber. In addition to the execution profiling 504, a currently executing process may also be configured to monitor progress of an asynchronous background operation (e.g. to determine if an asynchronous memory copy operation is still in progress). A conditional software condition can then be determined on the basis of this and software could yield conditionally and thus avoid (or stop) yielding if/when the background operation has completed. An example of this can be represented as:

12

```
start_asynch_operation ( ) ;
while (operation_still_in_progress ( ) )
{
    fiber_yield( );
}
```

This approach could also be used when offloading processing to accelerators, where it is desired to use poll-driven execution instead of interrupt-driven execution (which is likely to have much higher overheads). The fiber control and administration 506 is the process may also create additional fibers when this is determined (on the basis of the execution profiling 504) to results in increased throughput. This is made possible as fibers can be created dynamically from other fibers.

A further aspect of the present techniques is the provision of a fiber barrier. A fiber barrier stalls each fiber until all fibers have progressed to and entered the barrier. Only then are all fibers released and can continue execution beyond the barrier. Accordingly, a fiber barrier can be seen to be analogous to a thread barrier. A barrier counter variable can be implicitly specified (there only ever needs to be one) and thus located in the fiber data. A notable feature of the implementation of the fiber barrier shown below is the mechanism of resetting the barrier counter so that the barrier can immediately be re-entered by any fiber. This is achieved using the is_first_to_leave condition below.

```
Void fiber_barrier (void)
{
    / /Increment counter, one more fiber is waiting
    uint32_t me = fiber.bcnt++;
    / /Spin while not all fibers are waiting
    while (fiber.bcnt != fiber.qlen + 1)
    {
        / / Yield so that other fibers can proceed and enter the barrier
        fiber_yield( ) ;
    }
    / /All fibers have arrived
    / /It is safe to read fiber.qlen before any fiber has returned bool
    is_first_to_leave = me == fiber.qlen;
    / /Yield so that other fibers can also leave the while-loop
    fiber yield( ) ;
    / /All fibers have left the while-loop, we can now modify bcnt
    / /First fiber to leave resets barrier counter
    if (is_first_to_leave)
    {
        fiber.bcnt = 0;
    }
    / /Any fiber can now wait for the barrier again
}
```

Figure 7:
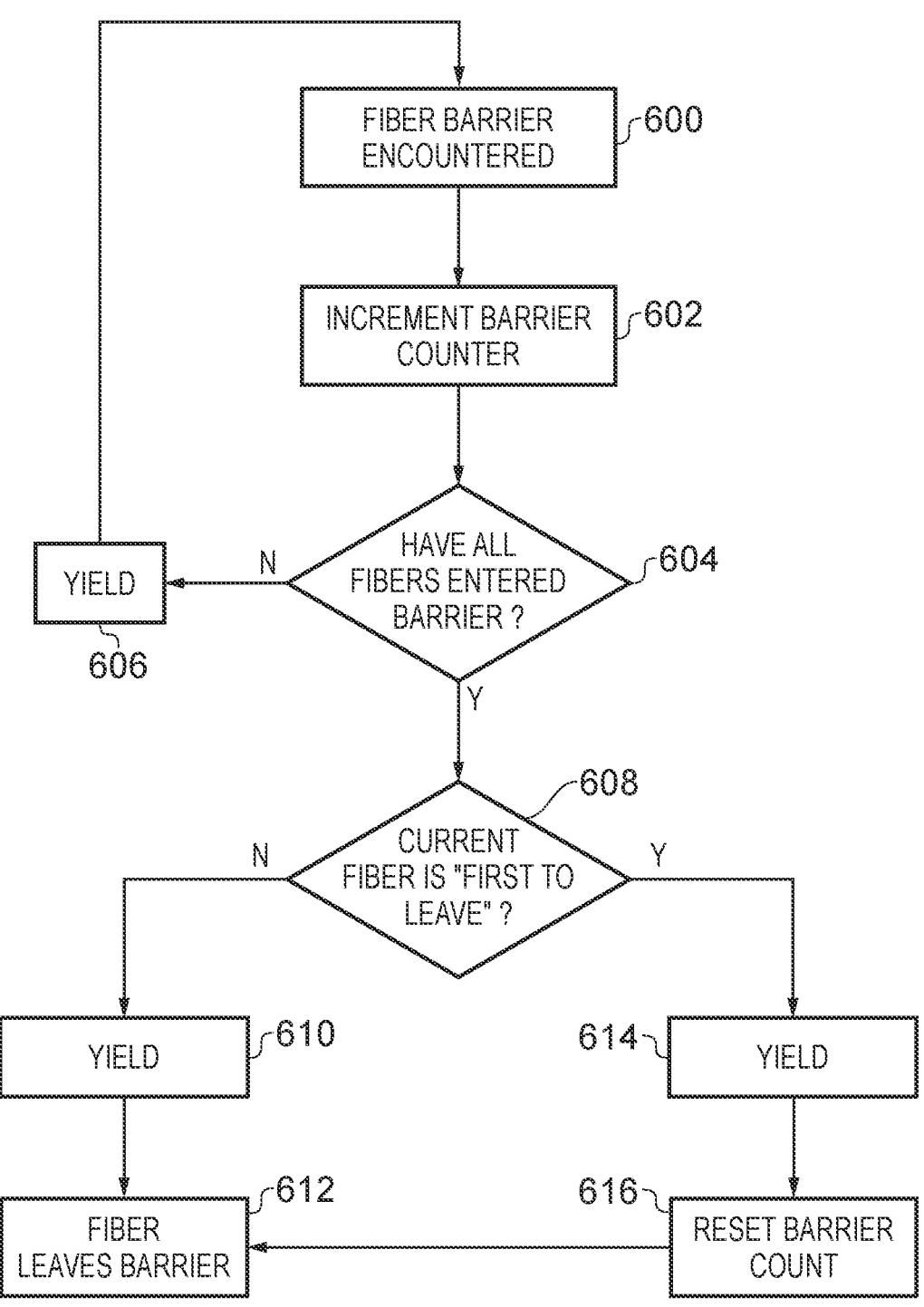
FIG. 7 is a flow diagram showing a sequence of steps which are taken by a data processing apparatus which schedules fiber execution with the use of a circular scheduler buffer when a fiber barrier is encountered in accordance with the method of some examples.

FIG. 7 is a flow diagram showing a sequence of steps which are taken by a data processing apparatus which schedules fiber execution with the use of a circular scheduler buffer when a fiber barrier is encountered in accordance with the method of some examples. The flow begins at step 600 when the fiber barrier is first encountered. The barrier counter is then incremented at step 602. At step 604 it is determined if all currently active fibers (i.e. those with valid circular scheduler queue entries) have entered the barrier. If this is not the case, the current fiber yields at step 606 and the flow returns to step 600 for the next fiber to encounter the fiber barrier. Once it is determined at step 604 that all fibers have entered the barrier, the flow proceeds to step 608 where it is determined if the current fiber is designated as the "first to leave" (refer to the Boolean is_first_to_leave in the above code example of fiber_barrier. If the current fiber is not "first to leave" then it yields at step 610 and leaves the barrier at step 612. Otherwise if the current fiber is the "first to leave" then it yields at step 614, resetting the barrier count at step 616, and leaves the barrier at step 612.

Various configurations are also set out in the following numbered clauses:

1. A method of data processing comprising:

performing data processing operations in response to program instructions, wherein the data processing operations comprise multiple processes;

operating a scheduler to support cooperative scheduling of the multiple processes, wherein the scheduler is configured to support the cooperative scheduling of the multiple processes with reference to a circular scheduler queue comprising one or more queue elements;

executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process:

to initiate execution of the next process by reading context data for the next process from the next queue element and writing context data for the currently executing process to the next queue element; and to advance the schedule pointer.

2. The method of data processing as defined in clause 1, wherein the program instructions comprise context switching instructions at a yield point in the program instructions, wherein the context switching instructions are arranged to cause all live registers other than a subset of live registers comprised by the context data for the current executing process written to the next queue element to be saved to memory, and to cause all live registers other than the subset of live registers comprised by the context data of the next process read from the next queue element to be restored from memory.

3. The method of data processing as claimed in claim 2, wherein the subset of live registers comprises a frame pointer, a stack pointer, and a program counter.

4. The method of data processing as claimed in claim 3, wherein the subset of live registers further comprises a base pointer.

5. The method of data processing as defined in any of clauses 2-4, wherein the yield point is indicated by the yield instruction in the program instructions.

6. The method of data processing as defined in any of clauses 2-4, wherein the yield point is identified by a compilation process in dependence on profiling data.

7. The method of data processing as defined in any of clauses 2-6, wherein the yield point is associated with a load operation.

8. The method of data processing as defined in any of clauses 2-7, wherein the yield point is associated with an asynchronous operation.

9. The method of data processing as defined in clause 8, wherein the asynchronous operation is one of:

an asynchronous memory copy operation;

an asynchronous cryptographic operation; and an asynchronous input/output operation.

10. The method of data processing as defined in any of clauses 1-9, further comprising performing an initialisation process prior to the performing data processing operations, wherein the initialisation process comprises instantiating a predetermined number of processes for cooperative scheduling by the scheduler.

11. The method of data processing as defined in clause 10, wherein the predetermined number of processes is programmer-defined.

12. The method of data processing as defined in any of clauses 1-11, wherein the performing data processing operations further comprises:

monitoring at least one data processing performance indicator; and in response to at least one performance criterion, instantiating a further process for cooperative scheduling by the scheduler by creating an additional queue element in the circular scheduler queue holding context data for the further process.

13. The method of data processing as defined in any of clauses 1-12, wherein the program instructions comprise a process barrier instruction defining a process barrier, and wherein the performing data processing operations comprises, in response to the process barrier instruction, stalling each of the multiple processes until all of the multiple processes have progressed to and entered the process barrier.

14. The method of data processing as defined in any of clauses 1-13, wherein the scheduler is responsive to the currently executing process yielding execution and an empty status of the circular scheduler queue to cause the currently executing process to continue execution.

15. The method of data processing as defined in any of clauses 1-14, wherein the scheduler is responsive to the currently executing process pausing or exiting execution and an empty status of the circular scheduler queue to cause the performing data processing operations to continue with a further process which is not cooperatively scheduled with reference to the circular scheduler queue.

16. The method of data processing as defined in any of clauses 1-15, wherein the currently executing process is configured to monitor progress of an asynchronous background operation and wherein yielding execution to the next process is dependent on a completion status of the asynchronous background operation.

17. The method of data processing as defined in any of clauses 1-16, wherein the performing data processing operations further comprises pausing a process for which selected context data is currently actively determining the currently executing process of the circular scheduler queue, wherein pausing the process comprises:

storing the selected context data to memory, and wherein the performing data processing operations further comprises resuming a paused process for which paused context data is stored in memory by:

creating a resumed queue element in the circular scheduler queue; and copying the paused context data from memory to the resumed queue element.

18. The method of data processing as defined in clause 2, or in any of clauses 3-17 when dependent on clause 2, further comprising:

performing a compilation process prior to the performing data processing operations, wherein the compilation process comprises transforming an input set of program instructions into a compiled set of program instructions, wherein the performing data processing operations is performed in response to execution of the compiled set of program instructions, and wherein the compilation process comprises introducing the context switching instructions at the yield point in the input set of program instructions.

19. A data processing apparatus comprising:

processing circuitry configured to perform data processing operations in response to program instructions, wherein the data processing operations comprise multiple processes and wherein the data processing operations comprise operating a scheduler to support cooperative scheduling of the multiple processes, wherein the scheduler is configured to support the cooperative scheduling of the multiple processes with reference to a circular scheduler queue comprising one or more queue elements, wherein the multiple processes cooperate for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduler is responsive to the currently executing process yielding execution to the next process:

to initiate execution of the next process by reading context data for the next process from the next queue element and writing context data for the currently executing process to the next queue element; and to advance the schedule pointer.

20. A data processing apparatus comprising:

means for performing data processing operations in response to program instructions, wherein the data processing operations comprise multiple processes;

scheduling means for supporting cooperative scheduling of the multiple processes, wherein the scheduler is configured to support the cooperative scheduling of the multiple processes with reference to a circular scheduler queue comprising one or more queue elements;

means for executing the multiple processes cooperatively for the cooperative scheduling in that each process of the multiple processes, when active as a currently executing process, is arranged to yield execution in response to a yield instruction in the program instructions to allow a next process of the multiple processes to continue execution, wherein a schedule pointer is indicative of a next queue element of the one or more queue elements, and wherein the scheduling means is responsive to the currently executing process yielding execution to the next process:

to initiate execution of the next process by reading context data for the next process from the next queue element and writing context data for the currently executing process to the next queue element; and to advance the schedule pointer.

In brief overall summary, methods of data processing and data processing apparatuses are disclosed. When performing data processing operations in response to program instructions, a scheduler is operated to support cooperative scheduling of multiple processes with reference to a circular scheduler queue comprising one or more queue elements. Each process of the multiple processes, when active as a currently executing process, is arranged to yield execution at a yield instruction to allow a next process of the multiple processes to continue execution. When the currently executing process yields, the scheduler initiates execution of the next process by reading context data for the next process from a queue element pointed to by a schedule pointer and writes the context data for the currently executing process to the same queue element, before advancing the schedule pointer. Lightweight cooperative scheduling is thereby supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. A method of data processing comprising:

performing data processing operations in response to compiled program instructions, wherein the data processing operations comprise multiple processes;

operating a scheduler to support cooperative scheduling of the multiple processes, wherein the scheduler is configured to support the cooperative scheduling of the multiple processes with reference to a circular scheduler queue in the scheduler, comprising one or more queue elements;

executing the multiple processes cooperatively for the cooperative scheduling in that each process of the multiple processes, when active as a currently executing process, is arranged to yield execution in response to a yield instruction in the compiled program instructions of the currently executing process to allow a next process of the multiple processes to continue execution, wherein:

a schedule pointer is indicative of a next queue element of the one or more queue elements, the scheduler is responsive to the currently executing process yielding execution to the next process:

to initiate execution of the next process by reading context data for the next process from the next queue element and writing context data for the currently executing process to the next queue element; and to increment the schedule pointer, and the compiled program instructions comprise context switching instructions at a yield point in the compiled program instructions, wherein the context switching instructions are arranged to cause all live registers, other than a subset of live registers comprised by the context data for the current executing process written to the next queue element in the scheduler, to be saved to memory, and to cause all live registers other than the subset of live registers comprised by the context data of the next process read from the next queue element in the scheduler, to be restored from memory.

2. The method of data processing as claimed in claim 1, wherein the subset of live registers comprises a frame pointer, a stack pointer, and a program counter.

3. The method of data processing as claimed in claim 2, wherein the subset of live registers further comprises a base pointer.

4. The method of data processing as claimed in claim 1, wherein the yield point is indicated by the yield instruction in the compiled program instructions.

5. The method of data processing as claimed in claim 1, wherein the yield point is identified by a compilation process in dependence on profiling data.

6. The method of data processing as claimed in claim 1, wherein the yield point is associated with a load operation.

7. The method of data processing as claimed in claim 1, wherein the yield point is associated with an asynchronous operation.

8. The method of data processing as claimed in claim 7, wherein the asynchronous operation is one of:

an asynchronous memory copy operation;

an asynchronous cryptographic operation; and an asynchronous input/output operation.

9. The method of data processing as claimed in claim 1, further comprising performing an initialisation process prior to the performing data processing operations, wherein the initialisation process comprises instantiating a predetermined number of processes for cooperative scheduling by the scheduler.

10. The method of data processing as claimed in claim 9, wherein the predetermined number of processes is programmer-defined.

11. The method of data processing as claimed in claim 1, wherein the performing data processing operations further comprises:

monitoring at least one data processing performance indicator; and in response to at least one performance criterion, instantiating a further process for cooperative scheduling by the scheduler by creating an additional queue element in the circular scheduler queue holding context data for the further process.

12. The method of data processing as claimed in claim 1, wherein the compiled program instructions comprise a process barrier instruction defining a process barrier, and wherein the performing data processing operations comprises, in response to the process barrier instruction, stalling each of the multiple processes until all of the multiple processes have progressed to and entered the process barrier.

13. The method of data processing as claimed in claim 1, wherein the scheduler is responsive to the currently executing process yielding execution and an empty status of the circular scheduler queue to cause the currently executing process to continue execution.

14. The method of data processing as claimed in claim 1, wherein the scheduler is responsive to the currently executing process pausing or exiting execution and an empty status of the circular scheduler queue to cause the performing data processing operations to continue with a further process which is not cooperatively scheduled with reference to the circular scheduler queue.

15. The method of data processing as claimed in claim 1, wherein the currently executing process is configured to monitor progress of an asynchronous background operation and wherein yielding execution to the next process is dependent on a completion status of the asynchronous background operation.

16. The method of data processing as claimed in claim 1, wherein the performing data processing operations further comprises pausing a process for which selected context data is currently actively determining the currently executing process of the circular scheduler queue, wherein pausing the process comprises:

storing the selected context data to memory, and wherein the performing data processing operations further comprises resuming a paused process for which paused context data is stored in memory by:

creating a resumed queue element in the circular scheduler queue; and copying the paused context data from memory to the resumed queue element.

17. The method of data processing as claimed in claim 11, further comprising:

performing a compilation process prior to the performing data processing operations, wherein the compilation process comprises transforming an input set of program instructions into the compiled program instructions, wherein the performing data processing operations is performed in response to execution of the compiled program instructions, and wherein the compilation process comprises introducing the context switching instructions at the yield point in the input set of program instructions.

18. A data processing apparatus comprising:

a scheduler;

processing circuitry configured to perform data processing operations in response to compiled program instructions, wherein the data processing operations comprise multiple processes and wherein the data processing operations comprise operating the scheduler to support cooperative scheduling of the multiple processes, wherein the scheduler is configured to support the cooperative scheduling of the multiple processes with reference to a circular scheduler queue in the scheduler comprising one or more queue elements, wherein the multiple processes cooperate for the cooperative scheduling in that each process of the multiple processes, when active as a currently executing process, is arranged to yield execution in response to a yield instruction in the compiled program instructions of the currently executing process to allow a next process of the multiple processes to continue execution, wherein:

a schedule pointer is indicative of a next queue element of the one or more queue elements, the scheduler is responsive to the currently executing process yielding execution to the next process:

to initiate execution of the next process by reading context data for the next process from the next queue element and writing context data for the currently executing process to the next queue element; and to increment the schedule pointer, and the compiled program instructions comprise context switching instructions at a yield point in the compiled program instructions, wherein the context switching instructions are arranged to cause all live registers, other than a subset of live registers comprised by the context data for the current executing process written to the next queue element, to be saved to memory, and to cause all live registers other than the subset of live registers comprised by the context data of the next process read from the next queue element to be restored from memory.

19. A data processing apparatus comprising:

means for performing data processing operations in response to compiled program instructions, wherein the data processing operations comprise multiple processes;

scheduling means for supporting cooperative scheduling of the multiple processes, wherein the scheduler is configured to support the cooperative scheduling of the multiple processes with reference to a circular scheduler queue in the scheduler comprising one or more queue elements;

means for executing the multiple processes cooperatively for the cooperative scheduling in that each process of the multiple processes, when active as a currently executing process, is arranged to yield execution in response to a yield instruction in the compiled program instructions of the currently executing process to allow a next process of the multiple processes to continue execution, wherein:

a schedule pointer is indicative of a next queue element of the one or more queue elements, the scheduling means is responsive to the currently executing process yielding execution to the next process:

to initiate execution of the next process by reading context data for the next process from the next queue element and writing context data for the currently executing process to the next queue element; and to increment the schedule pointer, and the compiled program instructions comprise context switching instructions at a yield point in the compiled program instructions, wherein the context switching instructions are arranged to cause all live registers, other than a subset of live registers comprised by the context data for the current executing process written to the next queue element, to be saved to memory, and to cause all live registers other than the subset of live registers comprised by the context data of the next process read from the next queue element to be restored from memory.

* * * * *